July 21, 1964  S. W. WATSON  3,141,577
ADJUSTABLE CONTAINER HOLDER
Filed Jan. 29, 1962  2 Sheets-Sheet 2
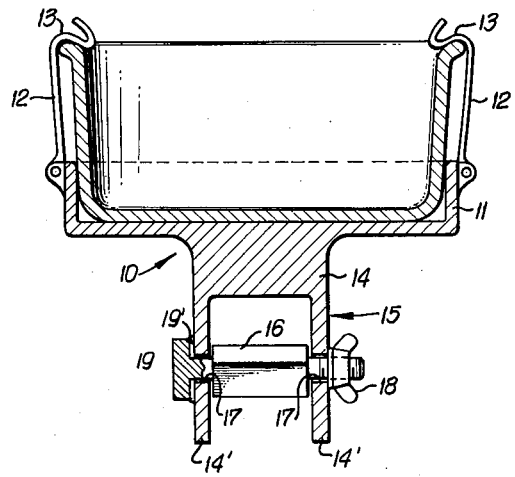
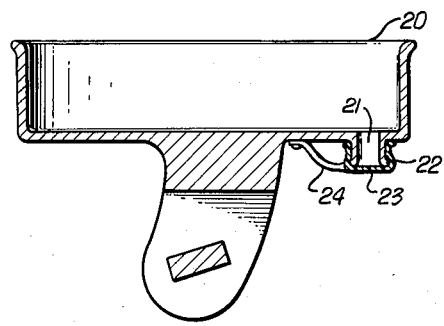
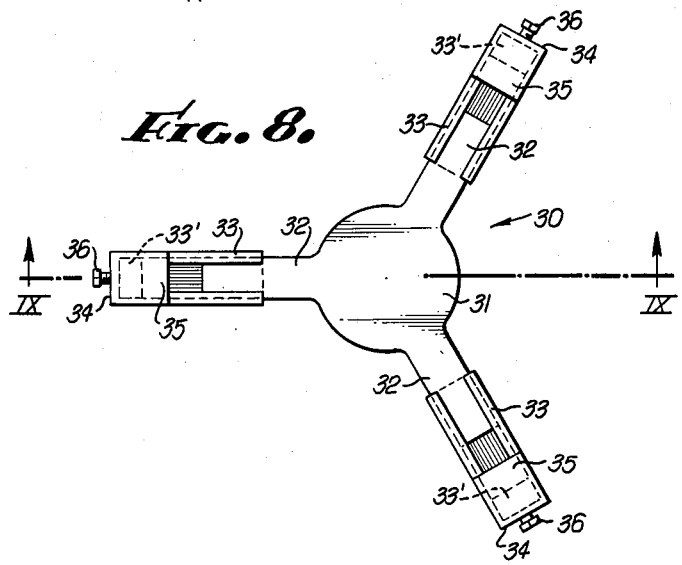
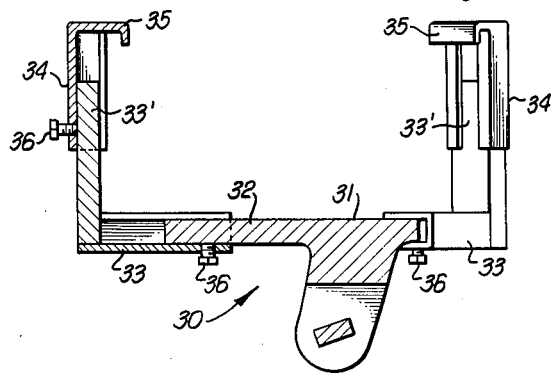
INVENTOR.
SUSANA W. WATSON
BY
Miketta and Glenny
ATTORNEYS.

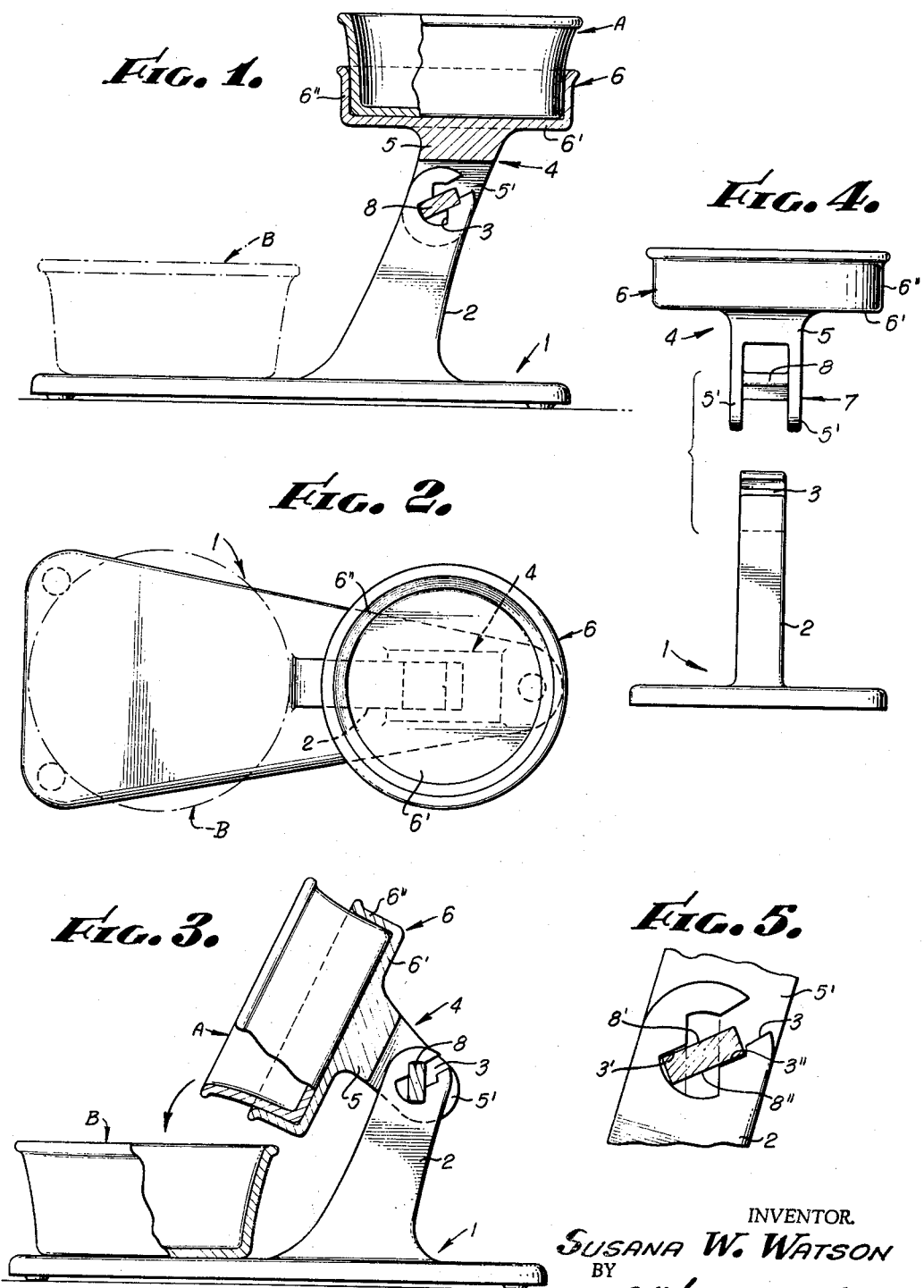

United States Patent Office 3,141,577
Patented July 21, 1964

3,141,577
ADJUSTABLE CONTAINER HOLDER
Susana W. Watson, 2019 Grace Ave.,
Hollywood 28, Calif.
Filed Jan. 29, 1962, Ser. No. 169,289
3 Claims. (Cl. 222—166)

In general, the present invention relates to a household device for holding containers so as to facilitate the removal of their contents. More specifically, the device of the present invention involves an adjustable container holder which can be used in the kitchen by the housewife to aid her preparation of foods.

As is well known, the preparation of foods often requires the mixing of ingredients in one container and the subsequent transfer of the mixture to another container. In order to complete such transfer, it is normally necessary to invert the container and scrape the final portions of mixture out of the container with a separate tool. In addition, it is frequently necessary when baking pies and cakes to pour viscous mixtures from one container into another at a slow steady rate.

Such operations performed in the kitchen are known to be awkward since they are normally done manually. In particular, in the usual household only a single person, i.e., the housewife, normally participates in the preparation of foods. Thus, the housewife is forced to hold the container or bowl containing the mixture to be transferred in the proper position while she scrapes the mixture out. Such operation makes it very easy to spill the mixture being transferred or to drop the container. Similarly, if the transfer requires a considerable length of time, merely holding the bowl can be quite tiring and a steady rate of transfer is very difficult to maintain.

The present invention involves a light, economical household container holder which greatly facilitates the removal of the contents of a container by only one person. The container holder of the present invention is adjustable so that both hands of the housewife are free to scrape the contents from the container during the transfer operation and the chance of dropping the container is eliminated. Also, the container may be left without manual support to complete the draining of the contents of the container from the container. In addition, the container holder of the present invention permits a slow, steady rate of transfer while leaving at least one of the housewife's hands free. Likewise, the container holder of the present invention utilizes simple, effective support, retaining and mounting means so that it can be economically and easily made and used.

In general, an object of the present invention is simple, adjustable household container adapted to facilitate the safe removal of the contents of a container.

Another object of the present invention is a kitchen container holder which permits a slow, steady rate of transfer of material from one container to another while leaving at least one of the housewife's hands free.

Still another object of the present invention is a kitchen container holder which employs simple support, retaining and mounting means so that it can be economically and easily made and used.

Other objects and advantages of the present invention will be readily apparent from the following description and drawings which illustrate exemplary embodiments of the present invention.

The household container holder of the present invention comprises in general, first, a base member. Rigidly attached to such base member is at least one column so that such column is maintained in an upright position. Mounted on said column is a support member adapted to receive a container. Such support member is rotatable from a substantially horizontal position to a substantially vertical position and is adapted to remain in each of said positions.

FIG. 1 is a partial section side view of one embodiment of the present invention with the support means in its horizontal position.

FIG. 2 is a top view of the device shown in FIG. 1.

FIG. 3 is a partial sectional side view of the device shown in FIG. 1 with the support means in substantially vertical position.

FIG. 4 is a disassembled rear view of the device shown in FIG. 1.

FIG. 5 is an enlarged view of the joint shown in FIG. 1.

FIG. 6 is a partial section rear view of another embodiment of the supporting means portion of the device shown in FIGS. 1–5.

FIG. 7 is a partial section side view of another embodiment of the support means portion of the device shown in FIGS. 1–5.

FIG. 8 is a top view of another embodiment of the support means portion of the device shown in FIGS. 1–5.

FIG. 9 is a sectional view of the support means shown in FIG. 8 taken along line IX—IX of FIG. 8.

The embodiment of the present invention shown in FIGS. 1–5 consists in general of a base 1 to which is rigidly attached a single column 2 in an upright position. Adjacent the top of column 2 is a slot 3 adapted to removably receive bar 8 of support member 4. The configuration of slot 3 is adapted to retain support member 4 in either a substantially horizontal position or a substantially vertical position while permitting free rotation between said positions.

Support member 4 is mounted on column 2 by means of post 5. One end of post 5 is rigidly attached to the bottom 6' of holder 6. The other end of post 5 forms a yoke 7 by means extensions 5' from post 5. Rigidly attached to and between extensions 5' is a rectangular bar 8. Yoke 7 and bar 8 are adapted to fit the top of post 2 and slot 3, respectively, so that support member 4 is maintained in either a substantially horizontal position or a substantially vertical position and free rotation between such positions is permitted in a single plane around an axis passing through bar 8. Also, as can be seen from FIGS. 1–5, the support member 4 can be removed from the column 2 merely by tilting the support member 4 slightly forward and then lifting it upwardly and to the rear.

Holder 6 is a circular pan which is adapted to receive the container to be supported, e.g., a bowl. The height of the side 6″ of holder 6 depends on the looseness of the fit between the container and the holder, the material used to make holder 6 and how far the support member is rotated to attain its substantially vertical position. If a loose fit and a rigid material such as metal, e.g., stainless steel, are used, then the support member may be rotated close to a perpendicular position, i.e., just short of a perpendicular position, e.g., FIG. 3, and the side 6″ of holder 6 shoulder be relatively high to prevent the container from slipping out of the holder during transfer of its contents. If a tight fit and a flexible material such as plastic, e.g., polyethylene, are used, then the support member may be rotated past a perpendicular position and a relatively low side 6″ of holder 6 may be used since the frictional fit between the container and holder prevents the container from slipping out during transfer of its contents. The use of a tight-fitting plastic holder with low sides is preferred since it permits the container to be tilted past the vertical position and thus facilitates transfer of its contents.

The utilization of the container holder shown in FIGS. 1–5 is very simple. Support member 4 is initially mounted on column 2 in a horizontal position. Such horizontal position is retained since the center of gravity of holder 6 in relation to the axis of rotation through bar 8 maintains such horizontal position, i.e., tends to rotate support member 4 in a clockwise direction. As can be seen from FIG. 1, in the horizontal position of support member 4, the lower portion of surface 8′ of bar 8 is supported by the lower portion of surface 3′ of slot 3 and the upper portion of surface 8″ of bar 8 is supported by the upper portion of surface 3″ of slot 3.

After mounting, a container A may be inserted into holder 6. To pour the contents of the container A into another receptacle B, the support means may merely be rotated by hand at the desired speed. Also the support means may be left in its vertical position to complete the draining of the container contents. Such vertical position is retained since the center of gravity of holder 6 in such vertical position now tends to rotate support member 4 in a counterclockwise direction. In short, the rotation of support member 4 moves its center of gravity in relation to the axis of rotation so that the desired horizontal or vertical position is maintained. The direction of rotation to change the horizontal position to the vertical position may be reversed if desired, e.g., the vertical position tends to rotate the support member in a clockwise direction. As can be seen from FIG. 3, in the vertical position of support member 4, the upper portion of surface 8′ of bar 8 is supported by the upper portion of surface 3′ of slot 3 and the lower portion of surface 8″ of bar 8 is supported by the lower portion of surface 3″ of slot 3.

FIG. 6 illustrates another embodiment of the support means which may be used with the present invention. In FIG. 6, the support means 10 includes a holder 11 having spring clips 12 attached to its upper rim. The free end of each spring clip 12 forms a hooking means 13 which is adapted to be secured to the upper rim of the container inserted into holder 11. With such arrangements, the holder 11 may be made of rigid material and the container only loosely fitted therein. The tension on clips 12 when hooking means 13 are attached to the upper rim of a container keeps the container in holder 11 even when supporting means 10 is tilted past the vertical position.

Also in FIG. 6 a post 14 is rigidly attached to the bottom of holder 11. The other end of post 14 forms a yoke 15 by means of extensions 14′. Rotatably attached between extensions 14′ is a rectangular bar 16 which is journaled in holes 17 in extensions 14′. One end of bar 16 terminates in a conventional bolt and wing nut arrangement 18. The other end of bar 16 terminates in a cap 19 having serrations 19′ on its inner surface which mate with serrations on the adjoining surface of extension 14′. When the wing nut and bolt arrangement 18 is tightened, the mating serrations of cap 19 and extension 14′ prevent rotation of bar 16. When the wing nut and bolt arrangement 18 is loosened, bar 16 may be rotated in any desired orientation with respect to post 14. Thus, the support means 10 of FIG. 6 may be adjusted to maintain any position between horizontal and vertical or positions substantially past vertical if desired.

FIG. 7 illustrates still another embodiment of the support means which may be used with the present invention. In FIG. 7, the holder 20 has an aperture 21 in its bottom with a ridge 22 around its outer mouth. The orifice may be closed by a cap 23 which may be fitted over ridge 22 and which may be suspended from the bottom of holder 22 by flexible attaching means 24. Holder 20 is made of a flexible material such as polyethylene plastic and preferably the other parts, such as cap 23, are made of the same material.

The holder 20 may be used with containers which slidably fit therein with only a small amount of friction. When the container is inserted into holder 20, aperture 21 is left open so that the air trapped in holder 20 may be expelled therethrough. After insertion of the container, aperture 21 is closed by putting cap 23 in place. Thus, removal of the container from holder 20 is effectively prevented by the vacuum created in holder 20. With such simple arrangement, the support means shown in FIG. 7 may be tilted past the vertical with a container held in place and insertion of a container into the holder is very easy.

FIGS. 8 and 9 illustrate still another support means which may be used with the present invention. In FIGS. 8 and 9 the holder 30 includes a flat central plate 31 having three lugs 32 which extend in the plane of plate 31 and are spaced at substantially equal angles. Slidably mounted on lugs 32 are angle arms 33. In turn, slidably mounted on the vertical portion 33′ of angle arms 33 are anchor arms 34. Each anchor arm 34 is surmounted by a hook 35 adapted to engage the upper rim of a container placed in holder 30. Each angle arm 33 and anchor arm 34 has threaded therein a screw 36 adapted to maintain said arms in position when tightened. The support means shown in FIGS. 8 and 9 may be adjusted to accommodate a wide range of container, shapes and sizes.

The embodiments of the present invention illustrated in FIGS. 1–9 used a bar and slot arrangement to mount the supporting means on the upright column and to determine the vertical and horizontal position of the support means. However, any other convenient arrangement may be used. For example, the supporting means may be permanently mounted on the upright column using a circular pin in place of a rectangular bar. In such arrangement, the vertical and horizontal positions may be determined by projections from the sides of the post which is attached to the bottom of the holder. Such post projection may contact the opposing side of the upright column and thus limit the rotation of the supporting means in each direction.

In view of the foregoing description, it can be seen that an important feature of the present invention is its simplicity and wide range of utility. Supporting means are illustrated which are designed to fit a container having specific shape and size or are designed to fit containers having a wide range of shapes and sizes. It should be noted that the holders utilized for a specific container shape and size such as noted in FIGS. 1–7 have the advantage that the holder itself may be used as a container.

In addition, most modern electric mixers are designed so that they can be removably attached to a single upright column and can be tilted forward for use or backward when not in use. Another feature of the present invention is that it is preferably used with the same upright column already used with the electric mixer. Of course, if desired, a separate upright column may be used but the making of such column would be simple and inexpensive since it could be identical to the electric mixer upright columns.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations, and modifications of the present invention which come within the scope of the following claims or to which the present invention is readily susceptible without departing from the spirit and scope of this disclosure are considered part of the present invention.

I claim:

1. A light, simple, adjustable household container holder adapted to facilitate the safe removal of the contents of an open container by one person, only, without spilling said contents, comprising:

(a) a base member with a single upright column rigidly attached thereto, said column having a shaped aperture adjacent the top thereof; and (b) a support member including: means to receive a container, means for removably mounting the support member on said column, said mounting means consisting of a yoke having a pair of parallel extensions, with a bar attached between said extensions; said bar, between the extensions of said yoke, removably fitting into said shaped column aperture, the aperture and the bar being shaped so that the fit of said bar in said aperture, when the support member is mounted on the column, permits free rotation of the support member between substantially a horizontal position and substantially a vertical position, said container receiving means being fixedly arranged with respect to said removable mounting means to maintain the support member in each of said positions by the weight of the support member, means connected with said shaped aperture for permitting said support member to be removed from said column merely by tilting and lifting the support member.

2. A holder as stated in claim 1, wherein there is a means for adjustably rotating the bar with respect to said yoke extensions whereby the attitude of the support member in the maintained positions can be adjusted.

3. A light, simple, adjustable household container holder adapted to facilitate the safe removal of the contents of an open container by one person, only, without spilling said contents, comprising:

(a) an open top container having continuous side walls and a closed bottom wall;

(b) a base member with a single upright column rigidly attached thereto, said column having a shaped aperture adjacent the top thereof; and (c) a support member including:

(1) means for removably mounting the support member on said column, said mounting means consisting of a yoke having a pair of parallel extensions, with a bar attached between said extensions, said bar, between the extensions of said yoke, removably fitting into said shaped column aperture, the aperture and the bar being shaped so that the fit of said bar in said aperture, when the support member is mounted on the column, permits free rotation of the support member between substantially a horizontal position and substantially a vertical position, means connected with said shaped aperture for permitting said support member to be removed from said column merely by tilting and lifting the support member;

(2) means for receiving said container, said container receiving means being fixedly arranged with respect to said removable mounting means to maintain the support member in each of said positions by the weight of the support member, said container receiving means consisting of an open topped vessel defined by continuous side walls and a bottom wall, said vessel being adapted to completely encircle and form an air tight enclosure with the side and bottom walls of said container, a hole in the bottom wall of said vessel, means to selectively open and close said hole, whereby the closing of the hole after the container is fit into said vessel forms a vacuum in the air tight enclosure to hold the container tightly in said vessel.

References Cited in the file of this patent
UNITED STATES PATENTS

| | | |
|---|---|---|
| 481,233 | Kuhns | Aug. 23, 1892 |
| 715,287 | Paine | Dec. 9, 1902 |
| 1,089,337 | Graham | Mar. 3, 1914 |
| 1,197,012 | Conlin | Sept. 5, 1916 |
| 1,336,307 | Loudon | Apr. 6, 1920 |
| 1,600,374 | Talbot | Sept. 21, 1926 |
| 1,786,994 | Halberstadter | June 22, 1927 |
| 1,887,881 | Blattner | Nov. 15, 1932 |
| 2,202,724 | Bean | May 28, 1940 |
| 2,302,756 | Ficke | Nov. 24, 1942 |
| 2,548,204 | Drake | Apr. 10, 1951 |